Oct. 15, 1935.    H. T. REYNOLDS    2,017,818
LIQUID DISPENSING DEVICE
Filed June 27, 1933
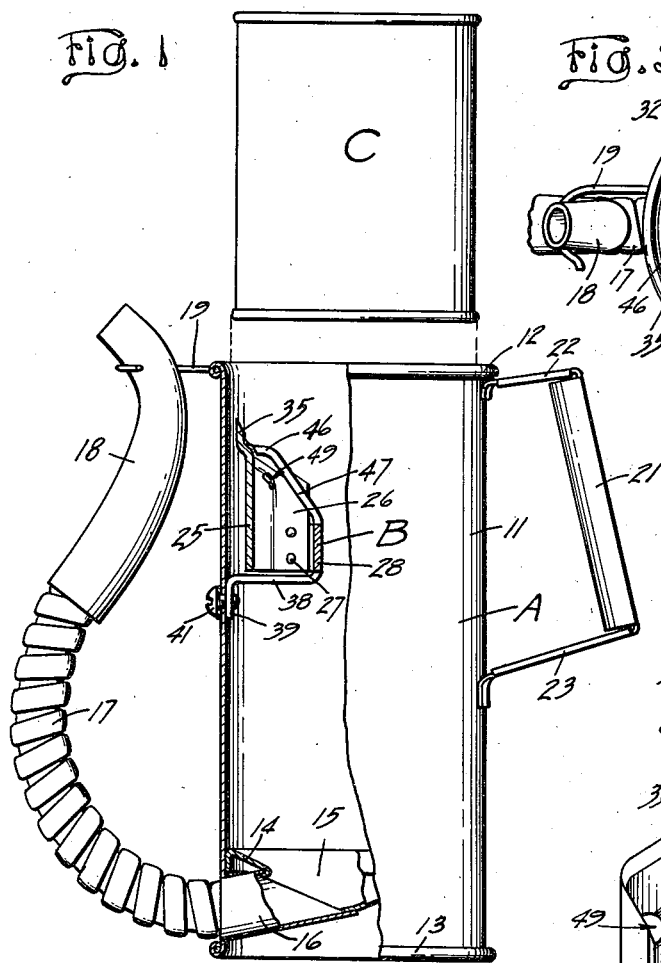
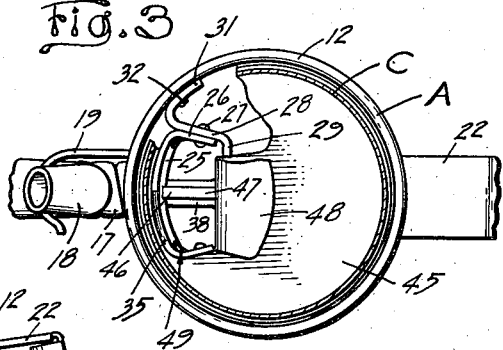
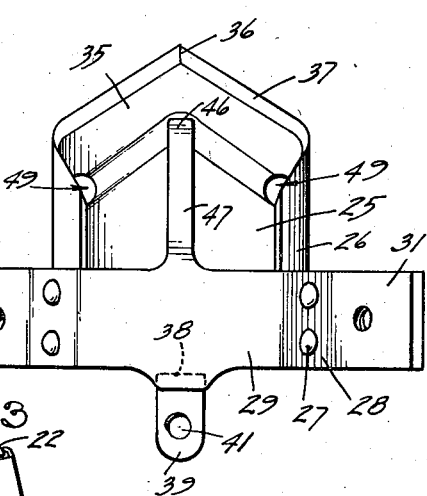
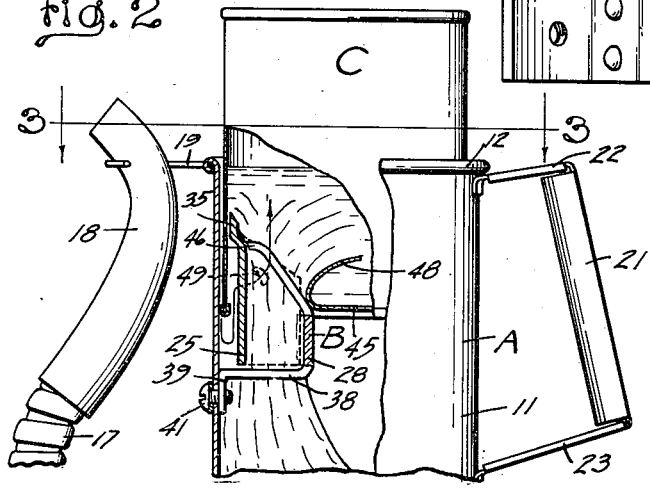
INVENTOR
Henry T. Reynolds
BY
ATTORNEYS Patented Oct. 15, 1935

2,017,818

UNITED STATES PATENT OFFICE 2,017,818

LIQUID DISPENSING DEVICE

Henry T. Reynolds, Lombard, Ill., assignor to Elmer L. Nall, Wheaton, Ill.

Application June 27, 1933, Serial No. 677,933

8 Claims. (Cl. 221—23)

The present invention relates to liquid dispensing devices and has for its object the improvement and simplification of a cutting element for a liquid dispenser which is arranged inside of and adjacent one of its side walls and which cuts open a sealed liquid containing receptacle as the latter is inserted in the dispenser, the liquid contents quickly flowing into the dispenser from the receptacle through the opening in the cut wall while the receptacle is held in the cutting element in an emptying position.

An object of the present invention is the provision of a single cutting element which is held in fixed position on an inside wall of a liquid dispenser, this element cutting into an end wall of a liquid containing receptacle when the latter is moved downward over the cutter, the liquid contents then quickly draining into the dispenser through the cut opening which is at a low drainage point of the receptacle as the liquid is being dispensed from the dispenser.

The invention also contemplates the use of a cutter of simple construction which combines in one single cutting element an easily insertable receptacle wall cutter which not only effects an opening for the discharge of the liquid in the receptacle with a simple single movement but at the same time lays back the metal of the cut wall and also vents the receptacle to produce a rapid draining.

Numerous other objects and advantages of the invention will be apparent as it is better understood from the following description, which, taken in connection with the accompanying drawing, discloses a preferred embodiment thereof.

Referring to the drawing:

Figure 1 is a side elevation of a liquid dispenser embodying the present invention, parts being broken away and parts being shown in section; the view also showing a sealed receptacle just above the open end of the dispenser and in position for insertion therein;

Fig. 2 is a similar view, the upper part of the liquid dispenser showing a sealed receptacle in liquid discharging position fully inserted and supported within the dispenser;

Fig. 3 is a plan sectional view partly broken away taken substantially along the line 3—3 in Fig. 2; and Fig. 4 is an enlarged front elevation in detail of the cutter detached from the dispenser.

The drawing illustrates a preferred embodiment of the invention as it is adapted to dispensing lubricating oil such as is used in automobiles and in such embodiment there are broadly three main elements, a dispenser A, a cutter B and a sealed oil container receptacle C.

The dispenser A is similar to dispensers now commonly used in oil and gasoline stations and in garages for dispensing lubricating oil into automobile crank cases and the like and is adapted to its instant use by those necessary changes which will be fully pointed out in the description that follows. It comprises a cylindrical body 11 open at the top and having an upper outwardly curled or rolled edge or bead 12 and a similar lower rolled edge or bead 13.

A bottom 14 is secured within the body 11 and is preferably depressed at 15 to form a discharge wall which directs the oil into a discharge pipe 16 connected by means of a flexible hose or tube 17 to a discharge spout 18. When the receptacle is in non-discharging position the spout 18 is adapted to be engaged and supported in the position illustrated in Figs. 1 and 3 by a hook 19 secured to and extending horizontally from the upper bead 12 of the body 11. A handle 21 is connected by an upper strap 22 and a lower strap 23 to the outside wall of the body 11 directly opposite to the hose and spout 17, 18.

A cutter B for opening the receptacle C is secured in the upper part of the body 11 of the dispenser A and is formed like the letter U with a curved body wall 25 (Figs. 1, 3 and 4) bent back on both sides at sharp angles into straight side walls 26. These walls 26 are secured by rivets 27 to legs 28 of a U-shaped supporting strap 29. The end of each leg 28 is bent outwardly into a foot or lug 31 and the two lugs are held rigidly against the inside wall of the body 11 by screws 32.

The cutter body 25 near its upper end is formed into a curved cutting wall 35 the curve of which is larger than the curve of the wall 25 and smaller than the curve of the inside wall of the dispenser. These curved surfaces are all concentric and the cutting wall 35 is spaced inwardly from the adjacent inner dispenser wall when the cutter is in its held position within the dispenser. This cutting wall is spear shaped along its upper edge coming to a center point 36 (Fig. 4). It is also beveled at 37 to provide a sharp cutting edge. The beveled edges extend along the tops of the side walls 26.

The U-strap 29 is further supported by a horizontal extension 38 which extends from the bottom edge of the center part of the strap, terminating in a foot 39 which is secured by a screw 41 to the wall of the body 11. The rigid mounting of the cutter B inside the dispenser A greatly facilitates its opening action as the filled receptacle C is introduced into the open upper end of the dispenser and pushed down on the cutter as will now be described.

Downward movement of the receptacle C within the dispenser impales its bottom wall 45 (Fig. 2) first on the cutter point 36 and thence the wall moves downwardly over the tapered cutting edges 37 and over the side walls 26. At the same time the bottom wall 45 strikes against and its cut portion is bent by a curved upper end 46 (Figs. 1 and 4) of a deflecting bar 47 preferably formed as an integral part of the strap 29 and extending upwardly at an angle from the upper edge of the strap.

The final position of the receptacle C within the dispenser A is illustrated in Fig. 2 where its bottom edge or rim rests upon the upper edge of the strap 29. The severed part of the wall 45 of the inserted receptacle C (designated by the numeral 48, Figs. 2 and 3) is now bent back over the inclined wall of the deflecting bar 47 and in cross section is curved as shown in Fig. 2. It is out of the way of the liquid flowing through the discharge opening. This discharge opening is obviously outlined on three sides by the lines of severance cut through the receptacle wall by the cutter. The cut edge adjacent the dispenser wall is substantially at the inside wall of the receptacle so that there is no bottom ledges of the receptacle bottom wall on that side to impede the flow of liquid through the opening.

In order to assist in rapid discharge of the liquid from the receptacle C, air is directed through the cutter and into the interior of the receptacle to replace the discharging liquid. The cutter wall 25 is perforated at 49 and air surrounding the receptacle C is led through the openings 49 (see Fig. 2) through the liquid in the receptacle and into the space above. Such air together with possible entrained air passing in through the discharge opening of the receptacle wall assists in a rapid and efficient flow of the oil from the receptacle into the dispenser.

The capacity of the dispenser A is such as to hold the entire contents of the liquid passing from the receptacle C without the final liquid level in the dispenser coming up to the bottom of the receptacle C. This receptacle, which in the embodiment shown, projects above the open end of the dispenser and is held in place with its opened bottom wall clinging to the cutter, this holding action being sufficient to prevent displacement while the oil is discharged through the flexible hose 17 and the pouring spout in the usual manner.

For the dispensing action the dispenser A is held by the handle 21 and the natural position of the dispenser at such time is slightly tilted so that the opening cut in the bottom wall of the receptacle by the cutter B is at the lowest position. This gives full draining time and insures removal of all of the contents of the receptacle C.

With a single downward pressure upon the receptacle C as it is inserted into the dispenser A sufficient of the engaged receptacle wall 45 is cut out to provide an adequate discharge opening from which the contained liquid cascades into the dispenser. The turned back wall 48, being entirely out of the way, offers no restriction to the flow of oil through the opening and the air rushing in through the discharge opening and being partly guided through the openings 49 in the cutter prevents any blocking of the flow because of inadequate venting. These openings 49 also assist in draining all of the oil from the cutter B after the receptacle C has been emptied.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A liquid dispensing device, comprising in combination, a dispenser adapted to receive a sealed receptacle containing a liquid to be dispensed and also adapted to receive and hold the liquid from said receptacle, and a cutter secured to the inside wall of said dispenser and having a cutting edge spaced from and substantially parallel to the said dispenser wall for cutting into the bottom of said receptacle and close along one side when it is inserted into the dispenser and forced down on the cutter to provide an opening in the bottom wall through which the liquid flows into the said dispenser, the latter having a liquid-containing bottom, the said opening being at the low drainage position during the dispensing of said liquid from said dispenser.

2. A liquid dispensing device, comprising in combination, a dispenser having a liquid-containing bottom and a dispensing spout on one side, and said dispenser being adapted to receive and support a sealed receptacle containing a liquid to be dispensed and also adapted to receive and hold the liquid from said receptacle, a cutter secured to the inside wall of said dispenser on the same side as said dispensing spout and having a cutting edge spaced from and substantially parallel to the said dispenser wall for cutting into said receptacle when it is inserted into the dispenser and forced down on the cutter to provide an opening in said receptacle adjacent said dispensing spout through which the liquid flows into said dispenser, and means for dispensing said liquid from said dispenser and through said spout while the receptacle is held therein.

3. A liquid dispensing device, comprising in combination, a dispenser adapted to receive a sealed receptacle containing a liquid to be dispensed and also adapted to receive the liquid from said receptacle, and a cutter secured inside of said dispenser on one side and having a cutting edge spaced from and substantially parallel to the said dispenser wall for cutting into said receptacle on one side when it is inserted into the dispenser and forced down on the cutter to provide an opening in said receptacle through which the liquid flows into the said dispenser, and means embodied in said cutter for venting said receptacle through its said cut opening simultaneously with said cutting so that the liquid contents of said receptacle are drained into said dispenser during the insertion of the former.

4. A liquid dispensing device, comprising in combination, a cylindrical dispenser having a dispensing spout on one side and adapted to receive and support a sealed receptacle containing a liquid to be dispensed and also adapted to receive the liquid from said receptacle, a cutter secured in the upper part of said dispenser on the same side as its dispensing spout and having a circular cutting edge for cutting into the bottom of said receptacle when the latter is inserted into the dispenser and forced down on the cutter so that one edge of the opening so formed is cut close to the receptacle wall on the spout side of the dispenser and all projections and ledges removed on that side, said cutter also having a supporting wall for limiting the downward movement of the receptacle, one wall of said cutter above said supporting wall also having vent openings for directing air into said receptacle to assist in the rapid discharge of said liquid during the insertion of said receptacle.

5. A liquid dispensing device, comprising in combination, a dispenser adapted to receive a sealed receptacle containing a liquid to be dispensed, and also adapted to receive the liquid from said receptacle, a U-shaped cutter secured to the inside wall of said dispenser on one side and having a cutting edge for cutting into said receptacle when it is inserted into the dispenser and forced down on the cutter, the middle cutting edge cutting close to the body wall, the said cutter providing an opening in said receptacle at the base of its body wall on that side through which the said liquid flows into said dispenser, and a deflecting bar secured to said cutter and operating during the insertion of said receptacle to turn back the receptacle wall included within the lines of cutting to enlarge said opening and to move the cut section out of the way of the liquid flowing from said receptacle.

6. In a liquid dispensing device, in combination, a dispenser adapted to receive a sealed receptacle containing a liquid to be dispensed, means in the body portion of said dispenser intermediate its top and bottom for supporting said sealed receptacle therein, said dispenser having a bottom portion whereby the dispenser is adapted to receive and hold the liquid from said receptacle, and a cutter secured within said dispenser and comprising a curved body terminating in transverse side walls and a deflecting member positioned between said side walls, said cutter being adapted to sever a portion of said receptacle and said member being adapted to displace said severed portion to produce a substantial pouring opening in said receptacle.

7. A cutter for producing a pouring opening in a container, comprising in combination, a curved body terminating in transverse side walls, the top edge of said body and walls being formed with a cut edge terminating in a central cutting point and a deflecting member associated with said body and walls and positioned intermediate said walls, said cut edge and said member being adapted to cut and deflect a container wall to be opened by said cutter.

8. A cutter for producing a pouring opening in a container, comprising in combination, a U-shaped knife terminating at its top in a cut edge and a support for said knife, said support having a deflector member extending centrally of said knife, said knife and deflector member being adapted to cut and deflect a wall of a container to be opened.

HENRY T. REYNOLDS.